United States Patent [19]

Griffith et al.

[11] 4,002,448
[45] Jan. 11, 1977

[54] METHOD AND APPARATUS FOR DETERMINING THE ELEVATION OF THE FUSION INTERFACE IN AN ELECTRIC GLASS MELTING FURNACE

[75] Inventors: James L. Griffith, Painted Post; Paul F. Spremulli, Corning, both of N.Y.

[73] Assignee: Corning Glass Works, Corning, N.Y.

[22] Filed: Apr. 29, 1976

[21] Appl. No.: 681,459

[52] U.S. Cl. .................................. 65/29; 65/158; 65/160

[51] Int. Cl.² .......................................... C03B 5/24

[58] Field of Search ...................... 65/29, 158, 160

[56] References Cited
UNITED STATES PATENTS

| 2,483,333 | 9/1949 | Cannon, Jr. et al. | 65/160 X |
| 2,679,749 | 6/1954 | Poole | 65/29 X |
| 3,192,302 | 6/1965 | Keefer | 13/6 |

Primary Examiner—Arthur D. Kellogg
Attorney, Agent, or Firm—Burton R. Turner; Clarence R. Patty, Jr.

[57] ABSTRACT

An apparatus and method for determining the elevation of the fusion interface between batch and molten glass in an electric glass-melting furnace is disclosed. A probe is driven vertically downwardly through the batch by a combination of a motorized drive assembly and a pneumatic hammer device. When the bottom tip of the probe penetrates the fusion interface, a current path is established from a furnace electrode through the molten glass to the probe tip, with such current flow thereby giving indication that the probe tip has descended to the elevation of the fusion interface.

4 Claims, 2 Drawing Figures

METHOD AND APPARATUS FOR DETERMINING THE ELEVATION OF THE FUSION INTERFACE IN AN ELECTRIC GLASS MELTING FURNACE

BACKGROUND OF THE INVENTION

This invention relates to a method and apparatus for determining the fusion interface between horizontally disposed batch material and molten glass in a glass melting furnace, and more particularly relates to a method and apparatus for determining the elevation of the fusion interface, wherein an electrical probe is forced downwardly through batch material by cyclically hammering the electrode into the batch and simultaneously continuously downwardly forcing the means for hammering the probe.

It is well known in the electric glass melting art that batch may be supplied to a furnace to form a blanket or cover over all or a portion of a bath of molten glass. A batch blanket or cover is typically formed in vertically oriented electric glass melting furnaces, as is illustrated in U.S. Pats. Nos. 3,583,861 to Preston, 3,524,206 to Boettner et al., 3,852,509 to Rutledge et al., and 3,942,968 to Pieper. As discussed in the Preston patent, the batch cover limits or minimizes heat losses from the molten glass; not only does this lead to conservation of energy, but it also tends to stabilize the convection currents generated in the bath. It will also be appreciated that the furnaces of these patents do not pollute the atmosphere, because there are no flames playing on the batch which will cause dusting or suspension of the particulate and gaseous matter in the air which is withdrawn from above the batch.

The Boettner patent teaches that it is desirable to control the power supply and rate of withdrawal of glass from the furnace to produce a batch cover having a downwardly extending, generally conical or stalactite contour on its lower fusion interface surface with the molten glass. In the Rutledge patent, various problems of maintaining the conical contour of the interface surface are discussed; and electrode arrangements and circuitry which solves the problems are disclosed therein. In brief, the electrodes may be arranged and fired to insure that the central portion of the fusion interface does not dip too deeply to cause unmelted materials to be withdrawn from the furnace and also to insure that the peripheral portions of the fusion interface is properly controlled to prevent both deleterious downward convection currents near the walls and excessive heat losses through the batch near the walls.

In order to control the electrical power supplied to the glass, control circuits, such as disclosed by McQuaid et al. in U.S. Pat. No. 3,636,227, have been suggested. Also, thermocouples have been employed to ascertain temperatures at various locations in the glass to give some indications as to the contour of the fusion interface. However, these devices have not provided the information needed to precisely determine the contour of the batch-molten glass fusion interface.

The present invention provides a method and apparatus for precisely determining the elevation or elevations of the fusion interface between batch and molten glass in an electrically heated glass melting furnace.

SUMMARY OF THE INVENTION

The apparatus of the present invention is used to determine the elevation of a fusion interface in an electrical glass melting furnace. It includes, in combination, a probe comprising an electrically conductive rod having a bottom tip; a pneumatic hammer device for intermittently or cyclically forcing the probe bottom tip vertically downwardly into batch material; motorized drive means connected to the pneumatic hammer device for continuously forcing the pneumatic hammer device downwardly toward the batch material and hence the probe into the batch; and means connected to the probe for detecting electrical current flow from the electrode to ascertain when the probe bottom tip is in contact with electrically heated molten glass.

The method of the present invention includes the steps of positioning an electrical probe of a rod form above batch material in an electrical glass melting furnace at a selected horizontal position relative to sidewalls of the furnace and a selected vertical position with respect to the batch cover or furnace; continuously pushing the probe downwardly through the batch at the selected position; while continuing to force the probe downwardly, cyclically hammering the probe through the batch and while pushing and hammering the probe through the batch, measuring the flow of current, if any, from the probe to determine whether the probe is in contact with the molten glass, whereby the elevation of the interface between the batch and molten glass is ascertainable from the amount of current flow through the probe and the vertical displacement from the initial selected vertical position.

DESCRIPTION OF PREFERRED EMBODIMENTS

Figure 1:
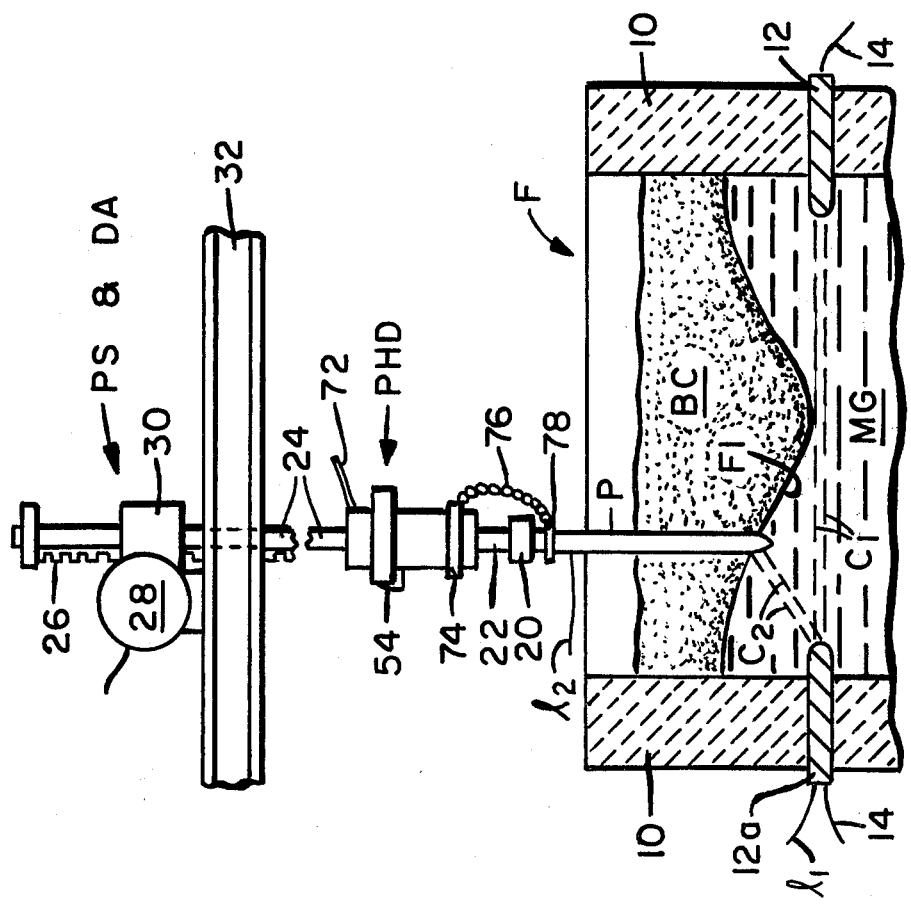
FIG. 1 is an elevational view of the apparatus of the present invention illustrated in connection with a particular and preferred use in measuring a fusion interface at the bottom of a batch cover within a vertically oriented electric glass melting furnace. For sake of clarity, a sectional view of only an upper portion of this type of furnace is shown.

A particular and preferred use for the apparatus and method of the present invention is, as previously stated, that of measuring the fusion interface between batch material and molten glass in a vertically oriented electric glass melting furnace. As illustrated in FIG. 1, this type of furnace F includes upstanding sidewalls 10 and a bottom wall (not shown) which define a chamber for containing a bath of molten glass MG; and electrodes 12 which extend into the molten glass, preferably through the sidewalls 10. Alternating electrical power, supplied through leads 14 connected by suitable means to the electrodes 12, generate electrical currents $C_1$ through the molten glass MG which heat the glass by means of the Joule effect. Reference may be made to the aforecited patents, wherein construction of various vertically oriented furnaces and various arrangements of electrodes therein are described.

Batch material is supplied to the upper end of the chamber to form a batch cover BC which may be essentially continuous across the molten glass MG; that is, the batch cover BC may, although not necessarily, extend completely across the surface of the molten glass MG. The batch cover BC is shown in a desired configuration which has a generally conical lower surface forming a fusion interface FI between it and the molten glass MG. For example, it may be desired that the batch cover have a thickness at the horizontal geometric center thereof in excess of 6 feet, but have a thickness of less than 2 feet at its juncture with the sidewalls 10. This configuration increases or maximizes the total area of the fusion interface FI, thus exposing a larger amount of batch material to heat transfer from the molten glass MG. In this manner the melting rate of the furnace is increased over what would be possible if the fusion interface FI were flat and thus had an area equal to the area defined by the horizontal profile defined by the sidewalls 10.

As will be appreciated by those skilled in the electric glass melting art, it is critical that the batch cover not be allowed to descend to the elevation of the electrodes 12. If it were to do so, the batch material would at least rapidly deteriorate the electrodes and at worst explode under the influence of the electrical power supplied by the electrodes 12. It is also necessary, as mentioned above, that the central portion of the fusion interface not be allowed to descend or dip too deeply into the bath of molten glass, because unmelted batch material may be carried away from such dipped portion and withdrawn from the furnace, thus developing stones of unmelted material in the downstream glass.

The apparatus of the present invention prevents such occurrences. As shown in FIG. 1, a fusion probe apparatus includes an electrical probe P of rod-like form made from an electrically conductive metal which is capable of withstanding high temperatures, such as a high temperature steel. The probe P has a lower tip and an upper end and may be of a cylindrical shape. It is vertically disposed; and its upper end is connected via a coupling 20 to an adaptor shaft 22, which is in turn engaged by a pneumatic hammer device PHD for cyclically forcing or hammering the probe into the batch material at a selected horizontal location in the batch cover BC where it is desired to make a measurement of the elevation of the fusion interface FI. The pneumatic hammer device PHD is in turn connected via a vertically oriented shaft 24 to a probe drive and support assembly, PS&DA. The drive and support assembly has a motor 28 and an associated reduction gear box device 30 which engages a rack 26 formed longitudinally on the shaft 24. The shaft is driven continuously downwardly by the assembly PS&DA, thereby continuously downwardly forcing the pneumatic hammer device and probe extending therefrom.

A detailed description of a preferred mode of construction for the probe support and drive assembly PS&DA will now be given. It will be understood, however, that the drive assembly PS&DA may include other motors, reduction gear devices, and means for supporting and guiding the shaft 24 than are hereinafter specified. The critical function of the drive assembly PS&DA is that of continuously downwardly driving pneumatic hammer device PHD and, hence, continuously forcing the electrical probe P into the batch cover BC in a downward vertical direction.

We have found that, for the motor 28, a Boston Gear ¾ H.P. D.C. Motor No. V97500TF may be used and that, for the reduction gear device 30, a Boston Gear Flanged Reductor No. FWC326B-100-61 may be employed. The reduction gear device 30 is connected by suitable coupling, to a pinion gear which engages the longitudinal rack 26 on the vertical shaft 24. To support and guide the shaft 24, a support device consisting of a tube having bushings within both of its end may be used; the bushings within both ends of the tube are adapted to guide the vertical movement of the shaft 24. For example, a support tube approximately 5 feet long may include guide bushings about 1 foot below and four feet above the location at which the pinion gear engages the rack 26 on the shaft 24. This type of elongated support tube works well in guiding a shaft 24 of a length exceeding 21 feet which is connected to a pneumatic hammer device PHD with the probe P retained therein being over 6 feet long, (i.e. a total distance of over 30 feet from the upper end of the shaft 24 to the bottom tip of the probe P). It is, however, noted that such an elongated support tube is not essential when the distance between the probe support and drive assembly and the batch cover is small.

The support and drive assembly PS&DA includes a framework 30 above the furnace F which is preferably mobile in at least one direction to permit fusion interface elevation measurements at various horizontal positions in the furnace, such as at the center of the batch cover and at the periphery thereof near the sidewalls 10. The framework 30 may advantageously be a part of a crane or batch distributor having tracks, etc. to provide such horizontal translational movement capability. When the furnace F has a symmetrical horizontal cross-sectional sidewall profile, a single linear or X-type of movement is satisfactory. However, when used in furnaces having a sidewall profile backing such symmetry, or more particularly, when batch is applied to have a non-symmetrical fusion interface profile it may be desirable to be able to move the probe P in horizontal directions transverse to such one direction.

It is preferable to provide the drive assembly with means for reversing the polarity of the voltage of the direct current supplied to the motor 28 to thus cause the drive assembly to remove the probe P after it has penetrated the fusion interface. For example, the current flowing from the probe may be used to activate or energize a relay device or control current for switching the voltage potential supplied to the motor 28. Such circuitry permits the probe to be automatically retracted, thereby eliminating manual manipulation of the probe, which is preferably avoided due to the electrical hazards associated with electric glass melting. Also, the automatic withdrawal means acts to protect the probe from unnecessary exposure to the extremely hot molten glass and corrosive batch crust or cover.

Figure 2:
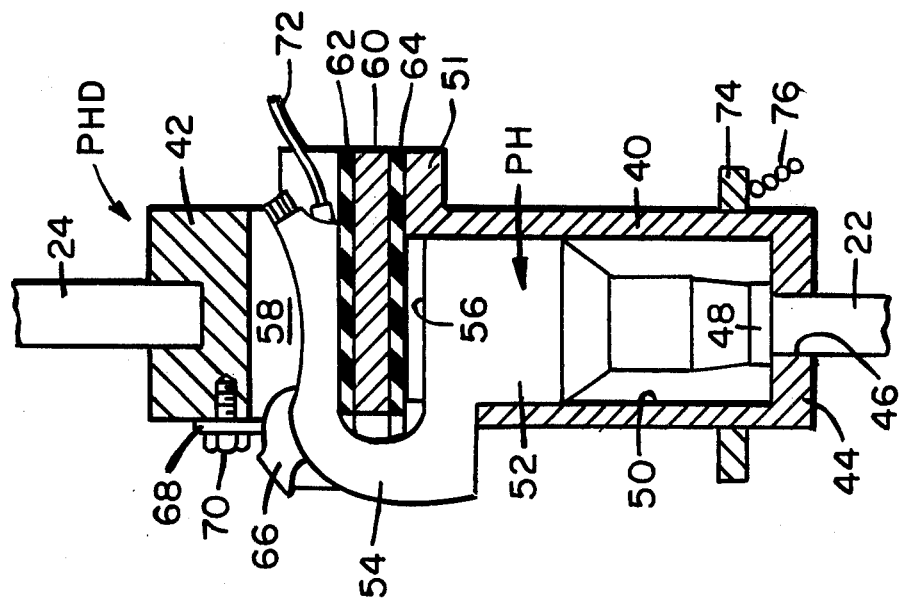
FIG. 2 is an elevational view, in partial cross-section, of a preferred construction of the pneumatic hammer device shown in FIG. 1.

Preferably, the pneumatic hammer PHD is non-operative or unactivated when the probe P is not frictionally engaged by the batch material. A preferred embodiment of a pneumatic hammer device meeting this criteria is shown in FIG. 2. It includes a pneumatic hammer PH, such as a chipping hammer of a conventional readily available design, which is hereinafter noted, and a housing or casing having a lower portion 40 and an upper portion 42. The lower portion 40 has a bottom end 44 extending transversely across the casing and having a central cylindrical bore 46 of a diameter greater than the outer diameter of the adaptor shaft 22. The adaptor shaft extends through the opening 46 and is retained in the lower receiving end 48 of the hammer PH. The lowermost surface of the retaining end 48 and an adjacent upper surface of the transverse casing portion 44 are complementary to permit the hammer to be stabily supported at its lower end by the casing. To reduce wear and also to guide the adaptor shaft 22, a not-illustrated bushing may be interposed within the opening 46 between the adaptor shaft and the casing.

The inner surface 50 of the casing lower portion 40 and an outer surface portion 52 of the hammer PN have complementary cylindrical contours which permit the hammer to slide longitudinally in the casing. A conventional chipping hammer may be utilized, since it includes a cylindrical outer surface portion 52 advantageously formed in the handle assembly or portion thereof. For example, a chipping hammer found to be well-suited for the present apparatus is a model CP-1 Simplate Chipping Hammer sold by the Chicago Pneumatic Tool Company (described in a company box insert titled, Utica Pneumatic 236, Eighth Edition, dated March, 1973). This particular chipping hammer has a handle 54 formed integrally with a hollowed cylindrical cup-like portion integrally connected to the handle. The cup-like portion has a cylinder outer or longitudinal surface, forming the portion 50, which is closed at an upper end which has a generally flat upper surface portion 56. The handle 54 has a contoured portion spaced apart from the upper surface 56 for the normal intended purpose of permitting one to grasp or grip the handle. The handle 54 projects transversely outwardly from the cylindrical portion 52 (as can be seen from FIGS. 1 and 2); and one side of the lower casing portion 40 is preferably cut away to receive such handle portion.

The chipping type of pneumatic hammer has a throttle lever or trigger 66 extending upwardly from the end of the handle connected to the cylindrical portion 52; and a tubing or hose 72, which supplies compressed air to operate the hammer, is connected to the other end of the handle 54. It should be noted at this point, that other types and constructions of the pneumatic hammers, other than what is hereby described for purposes setting forth a preferred embodiment of the pneumatic hammer device or assembly PHD, will be obvious to those skilled in the art; and it is not intended that the apparatus or method of the present invention be limited to such a specific type or construction of a pneumatic hammer.

Having thus given a detailed description of the pneumatic hammer PN, the remaining construction features of the casing and their cooperation with the pneumatic hammer will now be defined. The lower casing portion 40 has a flange 51 at its upper end, which is also cut-away or notched at one side to receive the handle 54. A metal plate 60, electrically isolated from the handle by sheets 62 and 64, is sandwiched between the upper and lower casing portions 42 and 40, with the plate and isolating sheets extending between the gripping portion of the handle 54 and the flat upper surface portion 56. The plate and isolating sheets and the casing parts are secured by suitable fasteners, such as bolts, which may also be electrically isolated from the casing parts 40 and 42. A suitable material for forming the sheets 62 and 64 and for electrically isolating the bolts has been found to be a resilient polymer sold under the trade name, Cohrlastic 700; this material is resilient and will withstand and cushion impact by the hammer. The upper casing portion 42 also has a hollow or cut-away 58 formed transversely therethrough to receive the handle 54, which may be of a squared U-shape in a plane normal to the elevational view of FIG. 2.

The upper casing portion 42 includes a stop means 68, which may be in the form of a plate secured to the casing by a bolt 70, which is positioned proximal to the trigger 66 of the hammer PN. The stop means 68 is also electrically isolated to prevent currents from travelling into the casing. When of a removable plate form, the plate 68 may extend from above the trigger 66 into the cut-away 58.

The casing upper portion 42 is connected to the shaft 24, by a fastener or by a welded joint. Another variation is that the shaft 24 and casing may be connected in a manner that electrically isolates the shaft 24 from the pneumatic hammer device PHD. This variation may eliminate the need to electrically isolate various parts of the hammer and casing parts, as aforedescribed.

The hammer PH, as stated before, rests in the casing against the transverse lower end portion 44. In this resting position, the trigger is not depressed by the stop means 58; and, of course, the hammer will be inactivated. The lower casing portion is constructed to support the plate 60 and sheet 62 therebelow in a spaced apart position from the hammer upper surface portion 56. To activate the hammer PH, all that is required is the force the whole pneumatic hammer assembly downwardly until the probe P frictionally engages the batch cover BC, whereupon the hammer, connected by the adaptor shaft 22, to the probe, will remain in place as the casing descends, the stop means 68 engages and then depresses the trigger 66, and the hammer is thus activated.

Although it is conceivable that the pneumatic hammer device PHD could be switched on or activated in a selective or automatic manner, the aforedescribed pneumatic hammer device advantageously eliminates this step, while yet assuring that the hammer is not activated when not in contact with the batch. This feature permits the use of inexpensive readily available chipping hammers which would be subject to mechanical deterioration and failure if operated with the tool connected thereto is not engaged against a work piece.

As shown, the probe P may be connected to the pneumatic hammer device PHD by a chain 76. That is, the hammer device casing may include a flange 74; the probe may also have a flange 78 formed thereon; and a chain 76 may be connected at its ends the two flanges. In this manner, the possibility that the probe may drop into the furnace F is avoided.

An important advantage of present invention is that it readily penetrates solidified glass-forming batch material. No known prior art apparatus has been found to accomplish this goal. The combined intermittent hammering force provided by pneumatic hammer has been found to be essential in accomplishing this goal. In fact, while operating under identical batch conditions, it was discovered that a motor and reduction gear drive assembly alone would quite often not force a probe through a batch blanket. In contrast, the combination of the present invention readily penetrated a batch blanket.

The method of determining a fusion interface elevations contemplated by this invention comprises the following steps: selectively positioning an electrical probe P above a batch cover BC in an electrical glass melting furnace F where it is desired to determine the elevation of fusion interface FI between the bottom of the batch cover BC and molten glass MG therebelow; simultaneously continuously pushing and cyclically hammering the electrical probe P vertically downwardly through the batch cover BC; detecting and measuring any flow of electrical current (such as currents C2 in FIG. 1) from the molten glass MG to probe P as it is forced into the batch cover BC; determining from the detection and measurement of such current flow from the probe P when the probe P has penetrated through the batch cover BC into the molten glass MG; and when the penetration through the batch cover has been determined, determining the vertical displacement of bottom tip of the electrical probe P from its initial selected height, thereby indicating the elevation of the fusion interface FI.

The method may be employed in connection with an electric glass melting furnace, of the aforementioned type, wherein alternating electrical currents C1 are supplied to heat the glass by the joule effect. Such currents C1 suffice to establish the current flow to the probe P which are to be detected and measured to give indication of penetration into the fusion interface FI. It is also possible to provide separate currents, C2, to establish such flow. This may be accomplished by providing an additional alternating electrical power source of a different preferably higher frequency than provided by the power source connected to leads 14, with such additional power source being connected to leads $1_1$ and $1_2$ connected respectively to the probe P and one of the furnace electrodes 14.

In any event, it is the presence and amount, in terms of amperes, of electrical current flow the probe P which indicates whether the bottom tip of the probe has been forced through the batch cover BC. Since the lower extent of the batch cover is relatively dense and at a high temperature, it will conduct at least a small amount of current. Thus, a measurement device, such as an ampmeter, connected to the lead 1 from the electrode, is used to determine whether enough flow has been generated to indicate actual penetration into the much more highly conductive molten glass MG. A threshold limit of approximately ½ ampere has been found to reliably indicate such penetration. Verification of the threshold level may be made by observing the tip of the probe P after removal from the batch; if it is red hot, there would, of course, be no doubt about the selected threshold current level.

Finally, the step of determining the distance of the bottom tip of the electrode after penetration into the fusion interface (i.e. after the current flow from the probe has exceeded the threshold level) may be effected visually or electromechanically. For example, the probe or the shaft 24 may have indicia thereon, such as inch and/or feet marks which can be viewed upon the indicated penetration to determine the displacement the probe or shaft from its starting position. Alternatively, to measure both the elevation of the fusion interface and the thickness of the batch cover at the same location, a digital volt meter may be employed; a first readout may be taken at the top of the batch cover and a second at the elevation of the indicated fusion interface. The volt meter may be activated by the rotational engagement of a variable resistor by the pinion gear.

To repeat, the simultaneous continuous driving and cyclical hammering step has been found for the reasons mentioned above, to be critical to a reliable method of using an electrical probe to determine the elevation of the fusion interface. A continuous driving process alone has been found to often fail in accomplishing penetration of glass-forming batch by an electrical probe.

Although the apparatus and method of the present invention have been described and shown in the drawings in particular and preferred embodiments thereof, it is not intended that the invention be limited thereto, except as will be determined to come within the scope and spirit of the following claims.

We claim:

1. In combination with an apparatus for indicating various elevations of a fusion interface between a batch cover and a bath of molten glass having electrical heating currents supplied thereto, including an electrical probe of rod form having a bottom tip for penetrating the batch cover; means for continuously driving the probe vertically downwardly into the batch cover; and means for detecting flow of electrical current from the probe, thus indicating when the probe has penetrated into the molten glass through the fusion interface, the improvement comprising pneumatic means for intermittently hammering the probe into the said batch cover simultaneously with the continuous driving thereof.

2. The apparatus of claim 1 wherein said pneumatic means comprises a casing and a pneumatic chipping supported therein in a sliding relationship with the casing, said chipping hammer initially resting on a bottom end of the casing, with the hammer having probe connecting means extending therefrom through an opening in the casing bottom end and a trigger means at its upper end which is initially unactivated, and said casing having stop means for depressing said trigger means when force is applied upwardly against said probe to lift said hammer within said casing.

3. An improved method of determining the location of a portion of a fusion interface between a batch cover and molten glass within an electrically heated furnace of the type including the steps of, providing an electrical probe at a selected horizontal and vertical position relative to the batch cover; continuously vertically downwardly driving the probe, to thereby continuously push the probe downwardly into the batch cover; and detecting current flow from the probe to determine when the probe has penetrated the fusion interface, whereby the elevation of the fusion interface is ascertainable; from the vertical displacement of the probe from its initial selected vertical position; the improvement comprising; while continuously downwardly pushing the probe, simultaneously cyclically hammering the probe into the batch cover.

4. The improved method of claim 3 wherein said cyclical hammering step is automatically activated by the force applied upwardly against said probe in response to said continuous pushing of the probe into the batch cover.

* * * * *